United States Patent [19]

Kowalski et al.

[11] Patent Number: 4,485,998
[45] Date of Patent: Dec. 4, 1984

[54] SPRING HANGER

[75] Inventors: Joseph W. Kowalski, Florissant, Mo.; Charles N. Cunneen, Navasota, Tex.

[73] Assignee: B-Line Systems, Inc., Highland, Ill.

[21] Appl. No.: 278,218

[22] Filed: Jun. 26, 1981

[51] Int. Cl.³ ............................................. F16M 13/00
[52] U.S. Cl. ...................................... 248/561; 248/613
[58] Field of Search ........................ 248/561, 613, 571; 267/178, 179, 70, 71, 72

[56] References Cited

U.S. PATENT DOCUMENTS

| | | | |
|---|---|---|---|
| 614,681 | 11/1898 | West | 267/71 X |
| 682,536 | 9/1901 | Duncanson | 267/71 |
| 2,125,861 | 8/1938 | Deckard | 267/70 UX |
| 2,372,125 | 4/1945 | Loepsinger | 248/59 |
| 2,553,960 | 5/1951 | Swart | 248/239 UX |
| 2,616,139 | 11/1952 | Wald et al. | 267/70 X |
| 2,873,078 | 2/1959 | Suozzo | 248/613 |
| 2,995,327 | 8/1961 | Wood | 248/613 X |
| 3,637,182 | 1/1972 | Bohlman | 248/231.4 |
| 4,006,873 | 2/1977 | Berger | 248/613 |
| 4,025,011 | 5/1977 | Rapps | 248/613 X |
| 4,083,522 | 4/1978 | Vandersip | 248/54 R |
| 4,176,815 | 12/1979 | Davidson et al. | 248/589 |
| 4,238,102 | 12/1980 | Salter | 248/543 |

Primary Examiner—J. Franklin Foss
Attorney, Agent, or Firm—Senniger, Powers, Leavitt and Roedel

[57] ABSTRACT

A spring hanger comprising a casing, a coil compression spring in the casing, a piston plate in the casing engageable with one end of the spring and adapted for connection to a load to be supported by the hanger, and a spring reaction member in the casing engageable by the other end of the spring, the piston, when connected to the load, being adapted for movement in the casing to compress the spring. Support members hold the reaction member in fixed position with respect to the casing against the expansionary force exerted by the spring when the latter is compressed against the reaction member. The support members are detachably secured in openings at spaced intervals around the casing and project into the interior of the casing, each member being engageable with the casing for resisting movement of the support member relative to the casing in the direction of the expansionary force while permitting movement of the support member in another direction relative to the casing for removal of the support member from its respective opening.

11 Claims, 7 Drawing Figures

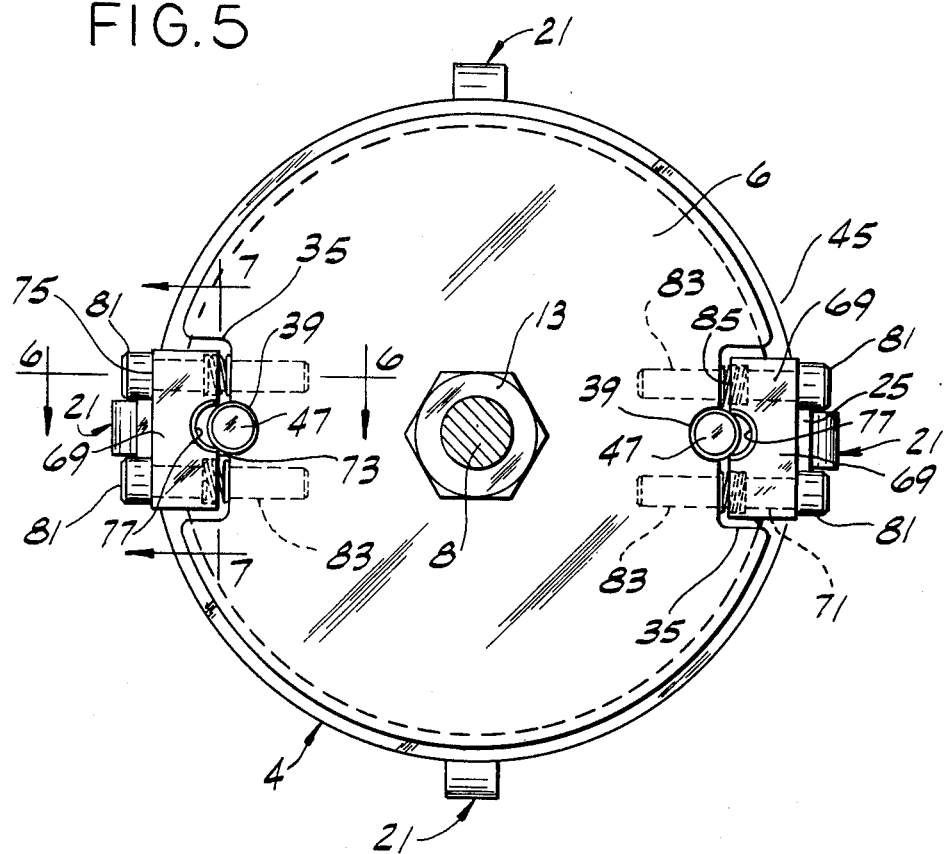

SPRING HANGER

BACKGROUND OF THE INVENTION

This invention relates generally to pipe supports or hangers and, more particularly, to a spring hanger designed to support a pipe while permitting vertical movement thereof due, for example, to thermal expansion and contraction of the pipe or other pipes of a piping system.

A conventional spring hanger comprises a cylindrical casing closed at its upper end by an end head or cover plate, and a coil compression spring inside the casing held compressed between a backing plate (referred to in the trade as a "piston" plate) adjacent the upper end of the casing and a reaction ring adjacent the lower end of the casing. A support rod connected at its upper end to an I-beam, for example, is threaded at its lower end into the upper end head of the casing for suspending the spring hanger from the beam. The upper end of a second rod is threaded up into a piston rod (referred to in the trade as a "turnbuckle") which extends vertically inside the casing down from the piston plate through the coil spring and reaction ring. A pipe clamp is carried at the lower end of this rod for supporting a pipe. When the hanger is subjected to a load, the piston plate moves down in the casing to compress the spring.

Heretofore, the reaction ring, against which the lower end of the coil spring bears, has been held in position relative to the spring casing in various ways, all of which have proven to be less than satisfactory. For example, the ring has been welded directly to the casing, but this destroys the galvanized finish of the parts, causing corrosion problems. The ring has also been supported by an underlying ring bolted to the casing. However, this arrangement is disadvantageous in that the bolts tend to loosen over time and to corrode. A snap ring received in an annular internal groove in the casing has also been used to retain the reaction ring in place, but such a groove substantially weakens the casing wall, especially where the casing is out-of-round.

Another problem associated with spring hangers has involved locking the piston plate at a selected axial (vertical) position within the spring casing. In this regard, a spring hanger is typically preloaded to a "design" load prior to installation by forcing the piston plate down a predetermined distance to compress the coil spring. The magnitude of this "design" load is calculated to be as close as possible to the actual (or "live" load) to be supported by the hanger when installed. After the hanger has been preloaded, the piston plate is mechanically locked in position relative to the casing, the hanger shipped to the place of installation and installed, the pipe clamped in place on the hanger at the proper pipe elevation, and the piston plate then released relative to the casing to transfer the live load of the pipe to the coil spring. If the "design" load matches the "live" load, the pipe supported by the hanger will remain at the same elevation when the piston plate is released. If not, the pipe will move up or down. The hanger is then adjusted to bring the pipe back to its proper elevation.

Changes to a piping system supported by spring hangers are frequent due to the addition of new equipment, new piping, etc. In such cases, it is desirable to again lock the piston plate relative to the casing of the hanger until the changes have been completed.

Prior to the present invention, the various means for securing the piston plate relative to the casing after the coil has been preloaded have been less than satisfactory. For example, one such means has been to insert a retaining pin through aligned holes in the casing and the side edge of the piston plate. While this system may be workable for the initial installation of the hanger, it cannot subsequently be used since the holes usually move out of alignment when the pin is removed to transfer the "live" load to the coil spring. Other arrangements have also been used to lock the piston plate relative to the casing prior to and during the initial installation of the hanger, but all have had drawbacks and few have been capable of effective use after the intial installation of the hanger has been commmpleted.

Reference may be made to U.S. Pat. Nos. 2,373,125, 4,176,185 and 4,238,102 for spring hangers and other devices relevant in a general sense to the present invention.

SUMMARY OF THE INVENTION

Among the several objects of this invention may be noted the provision of an improved spring hanger of the type hereinabove described; the provision of such a hanger which is corrosion-resistant; the provision of such a hanger having a novel adjustment feature whereby the piston plate may be selectively locked with respect to the casing at any time and in any position of axial (vertical) adjustment within a specified range of adjustment; and the provision of such a hanger which is easy to assemble.

In general, a spring hanger of this invention comprises a casing, a coil compression spring in the casing, piston means in the casing engageable with one end of the spring and adapted for connection to a load to be supported by the hanger, and a spring reaction member in the casing engageable by the other end of the spring, the piston means, when connected to the load, being adapted for movement in the casing to compress the spring.

In one aspect of the invention, support means engageable by the reaction member is provided in the casing for supporting the reaction plate in fixed position with respect to the casing against the expansionary force exerted thereon by the spring, when compressed. The support means comprises a plurality of support members adapted to be detachably secured in openings at spaced intervals around the casing with the members projecting into the interior of the casing for engagement by the reaction member. Each support member is engageable with the casing for resisting movement of the support member relative to the casing in the direction of said expansionary force while permitting movement of the support member in another direction relative to the casing for removal of the support member from its respective opening.

In another aspect of the invention, means is provided for selectively locking the piston means with respect to the casing in different positions of axial adjustment within a specified range of adjustment. The lock means comprises a rod on the piston means extending axially with respect to the casing and clamping means on the casing adapted to clamp against the rod.

Other objects and features will be in part apparent and in part pointed out hereinafter.

BRIEF DESCRIPTION OF THE DRAWINGS

FIG. 5 is a top plan view of the hanger on line 5—5 of FIG. 1 showing lock components of the spring hanger;

Corresponding reference characters indicate corresponding parts throughout the several views of the drawings.

DESCRIPTION OF A PREFERRED EMBODIMENT

Figure 1:
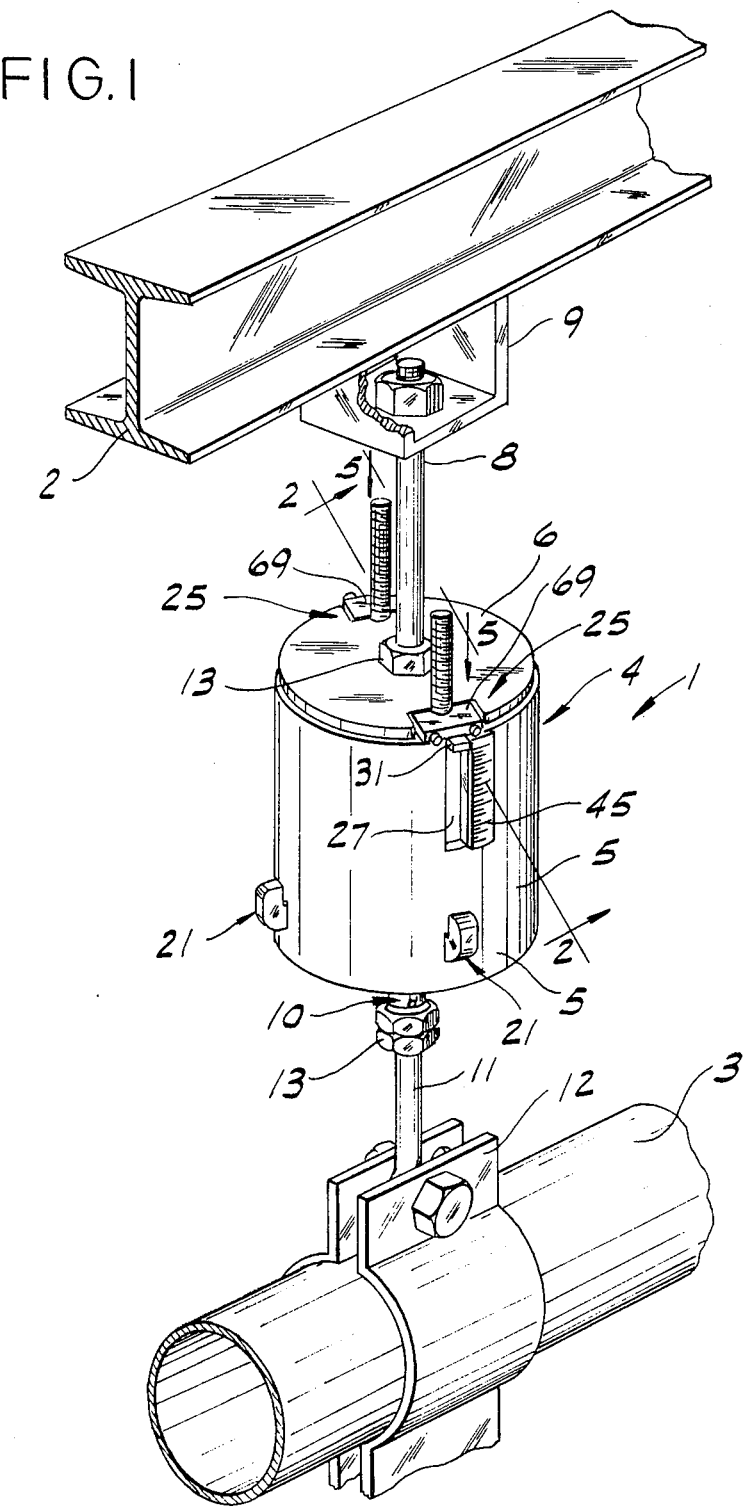
FIG. 1 is a perspective of a spring hanger of this invention shown installed beneath an I-beam and supporting a pipe.

Referring to FIG. 1 of the drawings, there is generally indicated at 1 a spring hanger of this invention suspended from an overhead structural member 2 (e.g., an I-beam) and supporting a load such as a pipe 3 of a piping system. The spring hanger comprises a casing generally designated 4 having a cylindrical body 5 disposed with its central longitudinal axis vertical. A circular end head or cover plate 6 secured (e.g., welded) on the upper end of the body has a central threaded hole 7 therein receiving the threaded lower end of a connecting rod 8 which is secured at its upper end to a U-shaped bracket or support 9 welded to the bottom flange of the I-beam 2. Piston means, indicated generally at 10, is movable vertically in the casing 4 and extends down beneath the open bottom thereof. A second connecting rod 11 is secured at its upper end to the piston means 10 and carries at its lower end a pipe clamp 12 which supports the pipe 3. Lock nuts 13 threaded on the connecting rods 8, 11 and bearing against the end head 6 and piston means 10 prevent unintended loosening of the rods.

Figure 2:
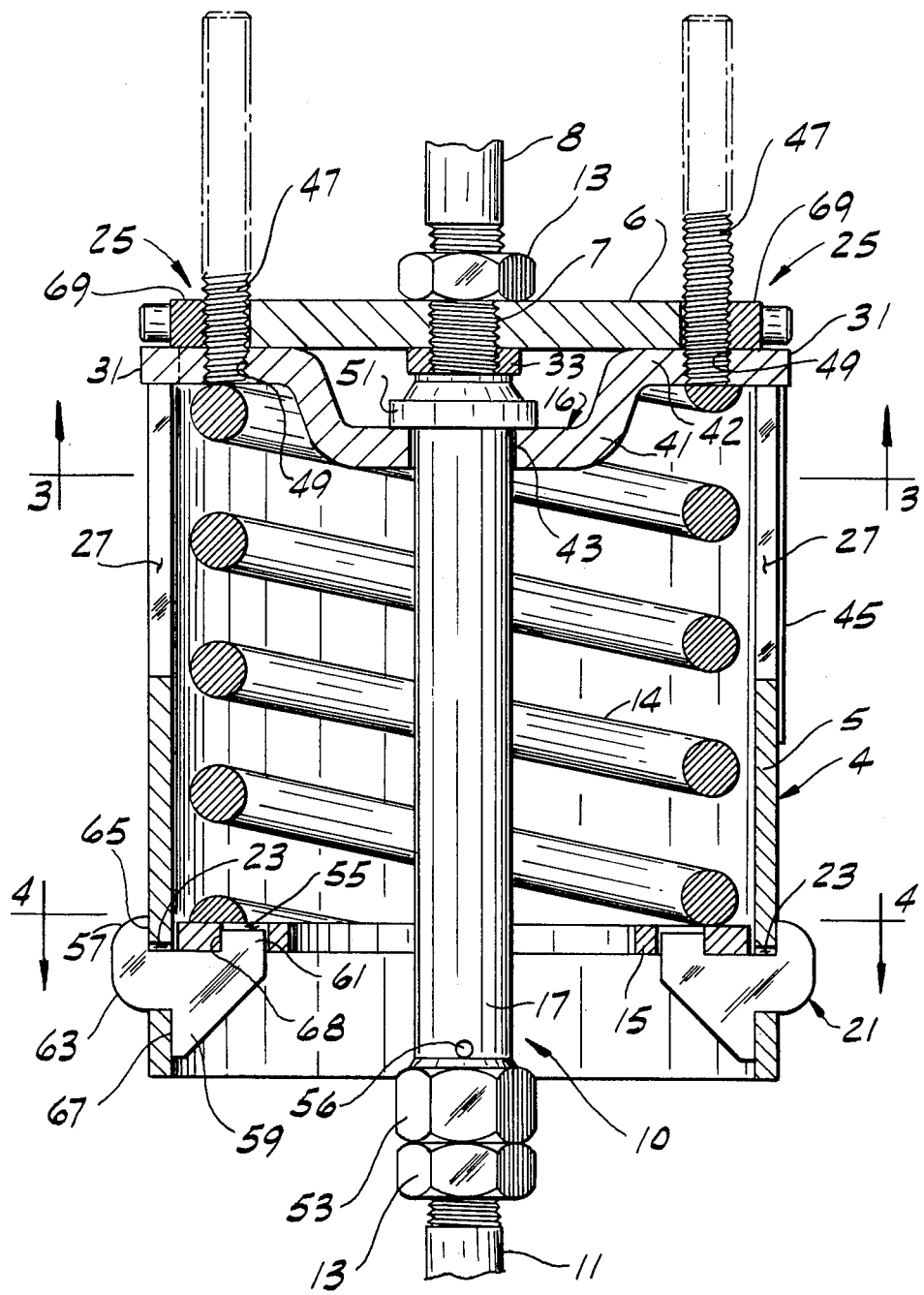
FIG. 2 is a vertical central section of the spring hanger on line 2—2 of FIG. 1.
Figure 3:
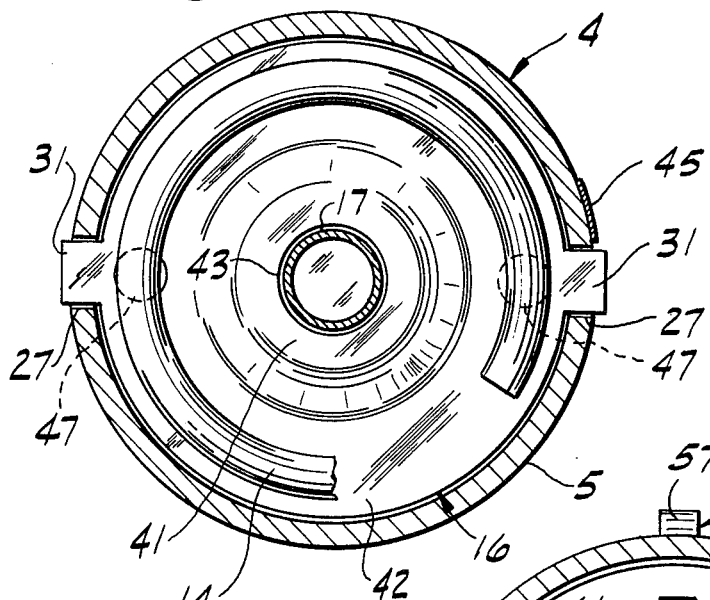
FIG. 3 is a horizontal section of the hanger on line 3—3 of FIG. 2.
Figure 4:
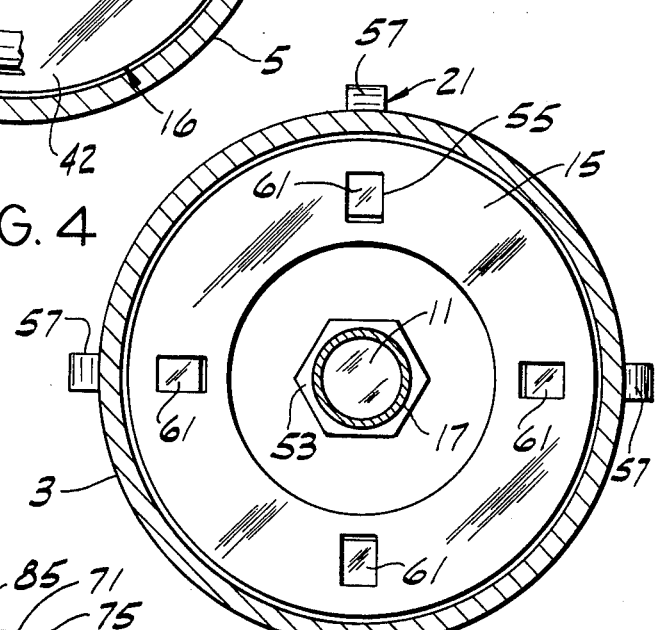
FIG. 4 is a horizontal section of the hanger on line 4—4 of FIG. 2.
Figure 6:
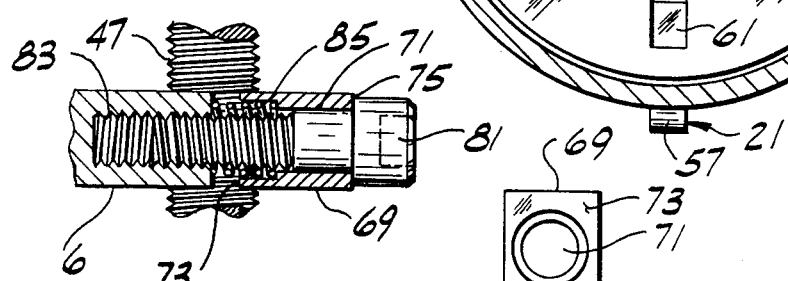
FIG. 6 is an enlarged vertical section of one of the locks on line 6—6 of FIG. 5 showing a movable clamping member of the lock.

As shown in FIG. 2, received within the casing 4 are a coil compression spring 14 cut at its upper and lower ends to present generally horizontal planar surfaces, a reaction member in the form of a ring 15 engageable by the lower end of the spring, and the piston means 10. The latter comprises a piston plate 16 engageable with the upper end of the spring, and a piston rod or so-called "turnbuckle" 17 extending down from the piston plate along the central vertical axis of the casing through the reaction ring 15 and out the open bottom of the casing. The lower end of the turnbuckle is internally threaded for receiving the upper threaded end of the lower connecting rod 11. Upon application of a load to the piston plate 16 (via the turnbuckle 17 and the lower connecting rod 8), the piston plate is pulled down to compress the coil spring 14. As will be described more fully hereinafter, the reaction ring 15 is supported in fixed position with respect to the casing against the downward expansionary force exerted by the spring by a plurality of support members 21 (e.g., four such members as illustrated) detachably secured in openings 23 at spaced intervals around the body 5 of the casing. Indicated generally at 25 is means for selectively locking the piston plate 16 with respect to the casing in different positions of vertical or axial adjustment within a range of adjustment.

More specifically, the cylindrical body 5 of the casing is formed from a tube of a suitable metal, such as steel pipe or formed plate, having a pair of diametrically opposing slots 27 therein extending down from the upper edge of the tube. The slots receive a pair of lugs 31 on the piston plate 16 for guiding the piston plate for vertical movement in the casing. The length of the slots 27 corresponds to the difference between the height of the coil spring 14 when unstressed and when fully compressed. The openings 23 for the support members 21 are machined in the casing body adjacent the lower end thereof and are spaced at equal intervals (e.g., at 90° or 120° intervals) around the casing.

The upper end head 6 is a disc of the same material as the casing body 5, but is of slightly smaller outer diameter than that of the casing body. The end head has a threaded reinforcing ring 33 on its underside in axial alignment with the hole 7 for receiving the lower end of the upper connecting rod 8, and a pair of rectangular recesses 35 in its peripheral edge spaced 180° apart (FIG. 5). Each of the recesses 35 in the end head has a semicircular portion, as indicated at 39. The end head functions, in conjunction with the slots 27 in the casing, to restrict vertical movement of the piston plate.

The piston plate 16 if of dished construction, having a downwardly offset central portion 41 received within the coil spring 14 for holding it centered on the piston plate, and a circular rim 42 engageable by the spring. The central portion of the plate has a hole 43 therethrough receiving the upper end of the turnbuckle 17, and is downwardly offset from the rim a distance sufficient to accommodate both the turnbuckle and the reinforcing ring 33 when the rim of the piston plate is in engagement with the upper end head 6. The two lugs 31 project outwardly from the peripheral edge of the rim 42 through the slots 27 in the body 5 of the casing. One of the lugs (e.g., the right lug as viewed in FIG. 2) serves as a pointer for reading a scale 45 on the casing calibrated to indicate the load required to compress the spring to the height indicated by the lug 31.

An annular flange 51 adjacent the upper end of the turnbuckle 17 bears on the top surface of the central portion 41 of the piston plate for transferring the load of the pipe 3 thereto. The turnbuckle is thus rotatable relative to the piston plate. A nut 53 is provided on the lower end of the turnbuckle for enabling it to be turned by a wrench, for example, in one direction to raise the lower connecting rod 11 and pipe 3, and in the opposite direction to lower the connecting rod and pipe. A sight hole 56 in the turnbuckle 17 above the nut 53 enables inspection of the upper end of the lower connecting rod to ensure that adequate thread engagement is maintained.

As shown best in FIG. 2, each support member 21 comprises a flat piece of suitable metal, such as galvanized steel, having first, second and third generally coplanar ears designated 57, 59 and 61, respectively, and a rounded pivot portion 63 between ears 57 and 59. When the support member is in its respective opening 23 in the casing wall, ears 57 and 59 are engageable with the casing to resist downward movement of the support member relative to the casing thereby to support the reaction ring 15 in fixed position with respect to the casing. Thus, the first ear 57 has an inwardly-directed face 65 which engages the outside wall of the casing above a respective opening 23 and the second ear 59 has an outwardly-directed face 67 which engages the inside wall of the casing below the opening. The third ear 61 extends up into a hole 55 in the reaction ring 15 and has a face 68 opposing face 65 of the first ear 57. The third ear 61 projecting up into hole 55 reduces the bending or moment forces exerted on the supported member (by translating such forces to vertical shear forces) thereby to avoid possible failure due to buckling of the casing in the area adjacent the openings 23. The distance between opposing faces 65 and 68 of the first and third ears is the same for all the support members to maintain a subtantially uniform spacing between the casing wall and the periphery of the reaction ring 15, the latter of which is dimensioned for a relatively loose fit inside the casing.

The rounded pivot portion 63 of the support member enables its installation in a respective opening 23 from the inside of the casing 4 by inserting the first ear 57 through the opening with its face 65 generally perpendicular to the vertical axis of the casing and then pivoting the support member down to bring the first and second ears into engagement with the casing. With the reaction member 15 moved down into bearing engagement on the support members, the support members are held in this position. To facilitate replacement of the coil spring, the support members may be removed by lifting the reaction ring up out of engagement with the support members, pivoting them upwardly, and withdrawing their first ears 57 from the openings.

Figure 7:
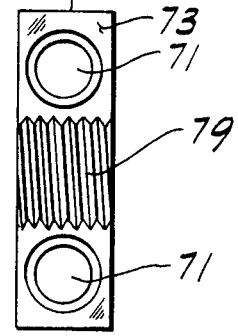
FIG. 7 is an enlarged end view of the clamping member of FIG. 6 on line 7—7 of FIG. 5.

Means 25 for selectively locking the piston plate 16 in different positions of axial adjustment with respect to the casing comprises a pair of elongate members constituted by two threaded adjustment rods 47 secured to the rim 42 of the piston plate and extending up through the semicircular portions 39 o the recesses 35 in the end head 6. Means 25 also includes a pair of clamp members 69 in the recesses 35 engageable with the rods 47 to secure them in selected position. Each of the clamp members is movable toward and away from a position in which it clamps against a respective rod 47. Each clamp member comprises a metal block having a pair of bores 71 extending therethrough from its inner face 73 to its outer face 75, as viewed in FIG. 5, and a semicircular recess 77 in its inner face between the holes 71 combining with the semicircular portion 39 of the respective recess in the end head 6 to define a circular hole receiving the respective rod 47. As shown in FIG. 7, the surface of the recess 77 has internal threads 79 complementary to the external threads on the rod 47. A pair of hexagon socket head screws 81 extend through the bores 71 in the clamp member and are threaded in a pair of blind end holes 83 in the end head 6 for adjustably securing the clamp member to the end head. A coil spring 85 is carried on the shank of each screw between the clamp member and end head for biasing the clamp member outwardly away from the rod 47. By turning the screws 81 in one direction, the clamp members 69 are moved outwardly under the bias of the springs to a position in which the clamp members are free of engagement with the rods 47 to enable the rods and the piston plate to move vertically in the casing to any position within the predetermined range of movement. By turning the screws 81 in the opposite direction, the clamp members 69 are moved inwardly to their clamping positions in which the threads 79 on the clamp members interengage the threaded rods 47 for locking the rods and the piston plate in place against axial movement.

This selective locking feature facilitates installation of the sprimg hanger 1 by enabling the piston plate 16 to hold the coil spring 14 at a compressed height corresponding to a "design" preload calculated to be equal to the actual load, so that upon transferring the weight of the supported load (e.g., the pipe 3) to the coil spring during installation of the spring hanger, there will be little or no vertical movement of the pipe 3. Thus the pipe may be installed and maintained at or near a predetermined elevation relative to the I-beam 2. To the extent that the "design" load differs from the actual load, the actual elevation of the pipe will differ from its predetermined elevation. However, this difference in elevation is usually relatively small and may be eliminated by turning the turnbuckle 17 in the proper direction so as to raise or lower the pipe.

To preload the spring hanger 1, the screws 81 are backed off to permit movement of the clamp members 69 out of engagement with the rods 47, a design load is applied to the turnbuckle 17 with a resultant corresponding downward movement of the piston plate 16 and compression of the coil spring, and the screws 81 are tightened to move the clamp members into clamping engagement with the rods to hold the piston plate in place and the coil spring compressed. On installation of the spring hanger, the pipe is suspended from the turnbuckle via the lower connecting rod 11 and pipe clamp 12 and the screws 81 are backed off to allow the clamp members to move out of engagement with the rods 47 for simultaneously removing the "design" load and transferring the actual load to the coil spring.

This selective locking feature is also useful after installation of the spring hanger 1, as when new pipes are to be added to the existing piping sytem supported by the hanger. Prior to making such changes, the screws 81 are turned to move the clamp members 69 inwardly to their clamping positions to hold the piping rigidly in place at the existing elevation. After the changes are complete, the screws 81 are backed of to again transfer the load to the coil spring. Adjustment of the turnbuckle 17 may be made to raise or lower the pipes to a new predetermined elevation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A spring hanger comprising a casing, a coil compression spring in the casing, piston means in the casing engageable with one end of the spring and adapted for connection to a load to be supported by the hanger, said piston means, when connected to said load, being adapted for movement in the casing to compress the spring, a spring reaction member in the casing engageable by the other end of the spring, and support means engageable by the reaction member for holding the latter in fixed position with respect to the casing against the expansionary force exerted by the spring when the latter is compressed against the reaction member, said support means comprising a plurality of support members adapted to be detachably secured in openings at spaced intervals around the casing with the members projecting into the interior of the casing for engagement by said reaction member, each member being engageable with the casing for resisting movement of the support member relative to the casing in the direction of said expansionary force while permitting movement of the support member in another direction relative to the casing for removal of the support member from its respective openings, said piston means being movable axially with respect to the casing, said hanger further comprising means for selectively locking said piston in different positions of axial adjustment within a range of adjustment, said locking means comprising a rod on the piston means extending axially with respect to the casing, and clamping means on the casing adapted to clamp against said rod for securing it in selected positions of axial adjustment, said casing comprising a cylindrical body and an end head at one end of the body, said rod extending axially of the casing from said piston means through said end head, said clamping means comprising a clamping member mounted on the end head and movable with respect thereto in a generally radial direction relative to the body of the casing for clamping against said rod.

2. A spring hanger as set forth in claim 1 wherein each of said support members has first and second ears, the first ear having a face engageable with the outside of the casing and the second ear having a face engageable with the inside of the casing.

3. A spring hanger as set forth in claim 2 wherein said support member has a rounded pivot portion between said first and second ears for enabling the support member to be inserted into a respective opening in the casing from the inside of the casing by inserting the first ear through the opening and then pivoting the support member on said pivot portion to bring said face of the first ear into engagement with the outside of the casing and said face of the second ear into engagement with the inside of the casing.

4. A spring hanger as set forth in claim 2 wherein said support member has a third ear receivable in an opening in said reaction member.

5. A spring hanger as set forth in claim 4 wherein said third ear has a face generally parallel to and opposing said face of the first ear.

6. A spring hanger as set forth in claim 4 wherein said first, second and third ears are substantially coplanar.

7. A spring hanger as set forth in claim 1 wherein said casing is cylindrical in shape and said reaction member is in the form of a ring.

8. A spring hanger as set forth in claim 7 wherein said ring is dimensioned for a relatively loose fit inside the casing.

9. A spring hanger as set forth in claim 1 wherein said rod and said clamping member are formed with threads adapted for interengagement when the clamping member is clamped against the rod thereby to lock the rod in an axial position of adjustment.

10. A spring hanger as set forth in claim 1 wherein said clamping member and said end head are formed with recesses therein combining to define a circular hole in the end head for receiving said rod therethrough.

11. A spring hanger as set forth in claim 1 wherein said clamping member is spring-biased away from a clamping position in which it is engageable with said rod.

* * * * *